United States Patent
Chuang et al.

(10) Patent No.: US 12,221,037 B2
(45) Date of Patent: Feb. 11, 2025

(54) AUXILIARY VEHICLE MIRROR DEVICE

(71) Applicant: KEN SEAN INDUSTRIES CO., LTD., Chang-Hua (TW)

(72) Inventors: Peng-Kai Chuang, Taichung (TW); Pei-Yu Hsieh, Chang-Hua (TW)

(73) Assignee: KEN SEAN INDUSTRIES CO., LTD., Chang-Hua (TW)

( * ) Notice: Subject to any disclaimer, the term of this patent is extended or adjusted under 35 U.S.C. 154(b) by 525 days.

(21) Appl. No.: 17/698,652

(22) Filed: Mar. 18, 2022

(65) Prior Publication Data

US 2023/0119302 A1    Apr. 20, 2023

(30) Foreign Application Priority Data

Oct. 18, 2021    (TW) .................................. 110212201

(51) Int. Cl.
*B60R 1/08*    (2006.01)

(52) U.S. Cl.
CPC ..................................... *B60R 1/08* (2013.01)

(58) Field of Classification Search
CPC .......................................................... B60R 1/08
USPC ........................................ 248/466, 421, 444.1
See application file for complete search history.

(56) References Cited

U.S. PATENT DOCUMENTS

| | | | | |
|---|---|---|---|---|
| 1,063,220 A * | 6/1913 | Seamon | ................. | F16M 11/12 248/278.1 |
| 5,106,177 A * | 4/1992 | Dolasia | ..................... | B60R 1/04 248/478 |
| 5,237,459 A * | 8/1993 | Strauss | .................... | B60R 1/002 359/881 |
| 5,259,582 A * | 11/1993 | DeLange, III | ............ | B60R 1/02 248/481 |
| 5,566,030 A * | 10/1996 | Yue | ........................ | A45D 42/00 359/872 |
| 6,132,051 A * | 10/2000 | Morell | ....................... | B60R 1/04 359/872 |
| 6,715,894 B1 * | 4/2004 | Taylor | ....................... | B60R 1/10 359/865 |
| 7,063,427 B1 * | 6/2006 | Cutler | .................... | G02B 7/002 359/872 |
| 9,039,211 B2 * | 5/2015 | Hoff | ........................ | B62J 29/00 359/842 |
| 10,247,908 B2 * | 4/2019 | Bohanan | ................. | B63B 49/00 |
| 11,019,910 B2 * | 6/2021 | Walton | ................. | F16M 11/105 |
| 11,530,049 B2 * | 12/2022 | Lafon | .................... | B64D 47/00 |
| 2002/0113189 A1 * | 8/2002 | Swain | ................... | B60R 1/0605 248/487 |
| 2003/0168572 A1 * | 9/2003 | Scheuble | ........... | F16M 11/2078 248/479 |

(Continued)

*Primary Examiner* — Monica E Millner
(74) *Attorney, Agent, or Firm* — Burris Law, PLLC

(57) ABSTRACT

An auxiliary vehicle mirror device includes a main rod unit, a securing unit and an auxiliary mirror unit. The main rod unit includes a connecting rod, first and second fixture rods connected perpendicularly to opposite ends of the connecting rod and extending respectively in opposite directions, and first and second ball fixtures disposed respectively on the first and second fixture rods. The first ball fixture is engaged with a first socket seat of the securing unit to be freely rotatable relative to it. The second ball fixture is engaged with a second socket seat of the auxiliary mirror unit to be freely rotatable relative to it.

5 Claims, 6 Drawing Sheets

(56) References Cited

U.S. PATENT DOCUMENTS

| | | | | |
|---|---|---|---|---|
| 2004/0217621 A1* | 11/2004 | McCoy | ................ | B60J 3/0204 |
| | | | | 296/97.6 |
| 2004/0233556 A1* | 11/2004 | LaViola | ................ | A45D 42/16 |
| | | | | 359/872 |
| 2007/0223120 A1* | 9/2007 | Kuo | ...................... | B60R 1/04 |
| | | | | 359/871 |
| 2019/0299865 A1* | 10/2019 | Bergman | ............ | F16M 13/022 |

* cited by examiner

AUXILIARY VEHICLE MIRROR DEVICE

CROSS-REFERENCE TO RELATED APPLICATION

This application claims priority to Taiwanese Utility Model Patent Application No. 110212201, filed on Oct. 18, 2021.

FIELD

The disclosure relates to a vehicle accessory, and more particularly to an auxiliary vehicle mirror device.

BACKGROUND

A rear-view mirror of a vehicle has the function of allowing a driver of the vehicle to see passengers in the rear seats. When the passenger is a child that needs constant monitoring, the driver would watch the child through the rear-view mirror. However, the conventional rear-view mirror may have a limited rotational angle, and the driver may not be able to monitor the passengers in the rear at all times.

The conventional rear-view mirror uses a plane mirror and is limited in size. Therefore, it has a rather large blind spot, and cannot by itself provide the driver with enough awareness of the traffic behind the vehicle.

If the passengers in the rear wish to exit the vehicle, and only monitored incoming traffic via the rear-view mirror without looking back to verify the traffic situation and opening the vehicle doors, accidents may happen.

The above mentioned three scenarios highlight situations where the conventional rear-view mirror does not provide enough monitoring capability and should be improved.

SUMMARY

Therefore, an object of the disclosure is to provide an auxiliary vehicle mirror device that can alleviate at least one of the drawbacks of the prior art.

According to the disclosure, an auxiliary vehicle mirror device is adapted to be mounted to a vehicle accessory, and includes a main rod unit, a securing unit, and an auxiliary mirror unit. The main rod unit includes a connecting rod, a first fixture rod, a first ball fixture, a second fixture rod and a second ball fixture. The connecting rod extends in a first direction, and has a first end and a second end opposite to each other in the first direction. The first fixture rod is straight, and extends from the first end of the connecting rod in a second direction which is perpendicular to the first direction. The first ball fixture is disposed on a distal end of the first fixture rod. The second fixture rod is straight, and extends from the second end of the connecting rod in a third direction which is perpendicular to the first direction and opposite to the second direction. The second ball fixture is disposed on a distal end of the second fixture rod. The securing unit includes an attachment seat that is adapted to be mounted to the vehicle accessory, and a first socket seat that is disposed on the attachment seat, and that has a first socket space engaged with the first ball fixture. The first ball fixture is freely rotatable relative to the first socket seat, is held stationary by the first socket seat when not rotating, and is inseparable from the first socket space. The auxiliary mirror unit includes a connection seat, a mirror, and a second socket seat. The connection seat has a first surface and a second surface opposite to the first surface. The mirror is fixed to the first surface of the connection seat. The second socket seat is disposed on the second surface of the connection seat, and has a second socket space engaged with the second ball fixture. The second socket seat is freely rotatable relative to the second ball fixture, is held stationary by the second ball fixture when not rotating, and is inseparable from the second ball fixture.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Below is a detailed description of the disclosure in conjunction with the accompanying drawings and the embodiments.

Figure 1:
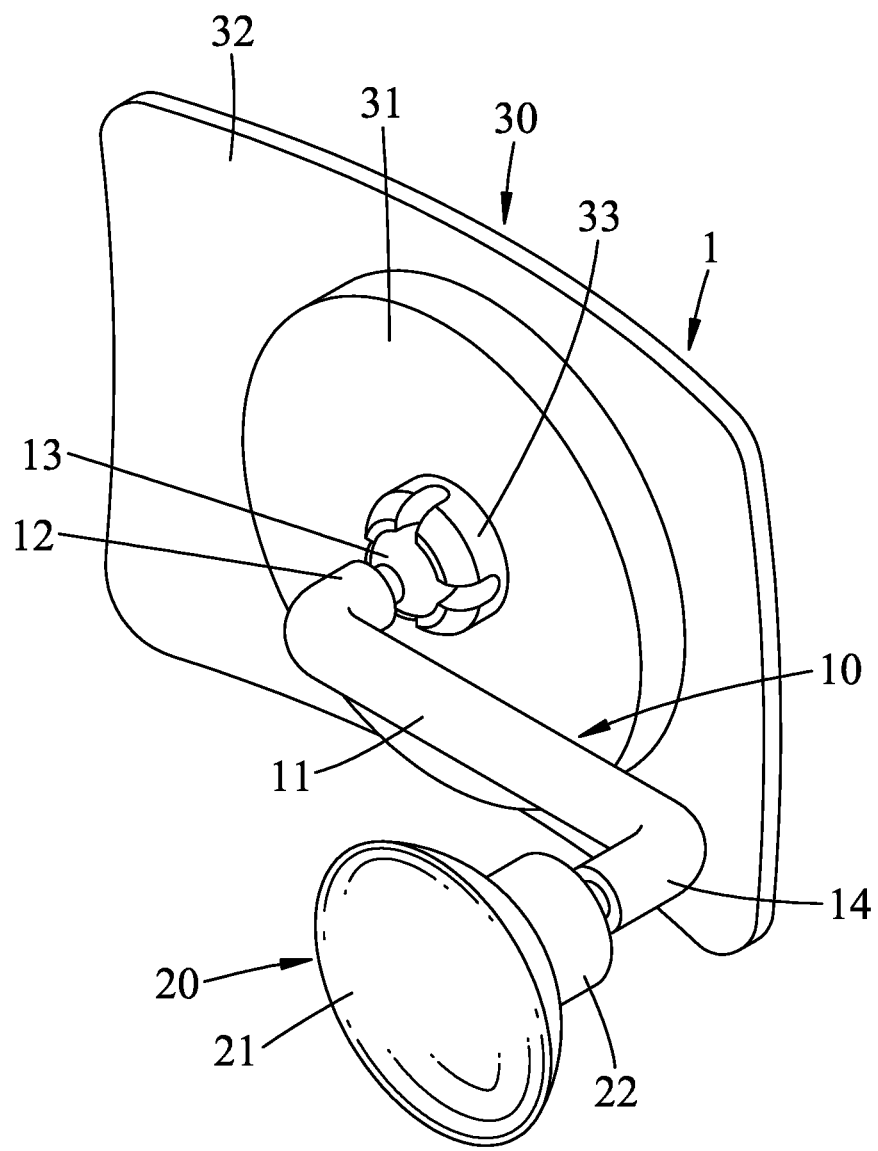
FIG. 1 is a perspective view of an embodiment of an auxiliary vehicle mirror device according to the present disclosure.
Figure 2:
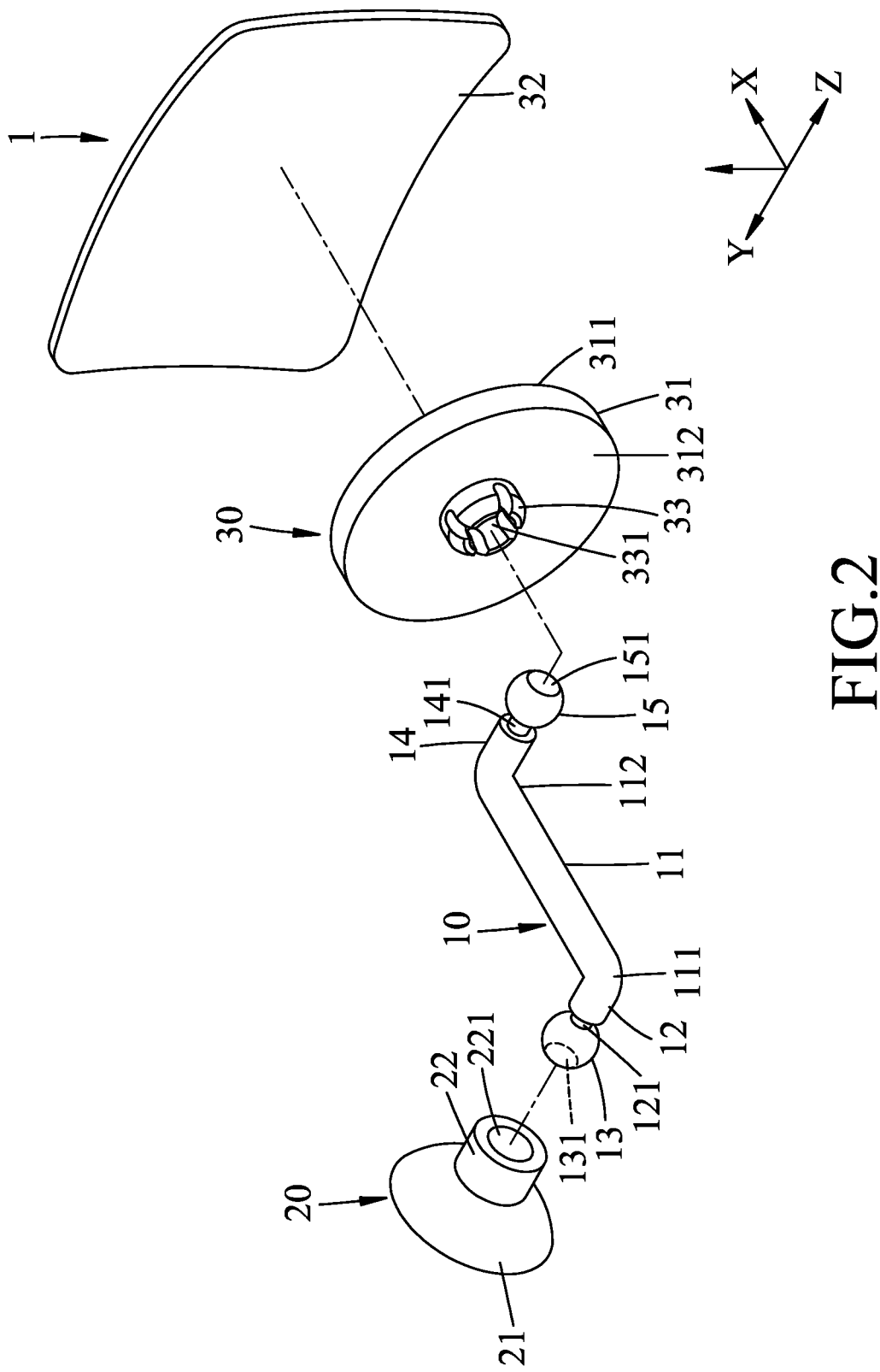
FIG. 2 is an exploded perspective view of the embodiment.
Figure 3:
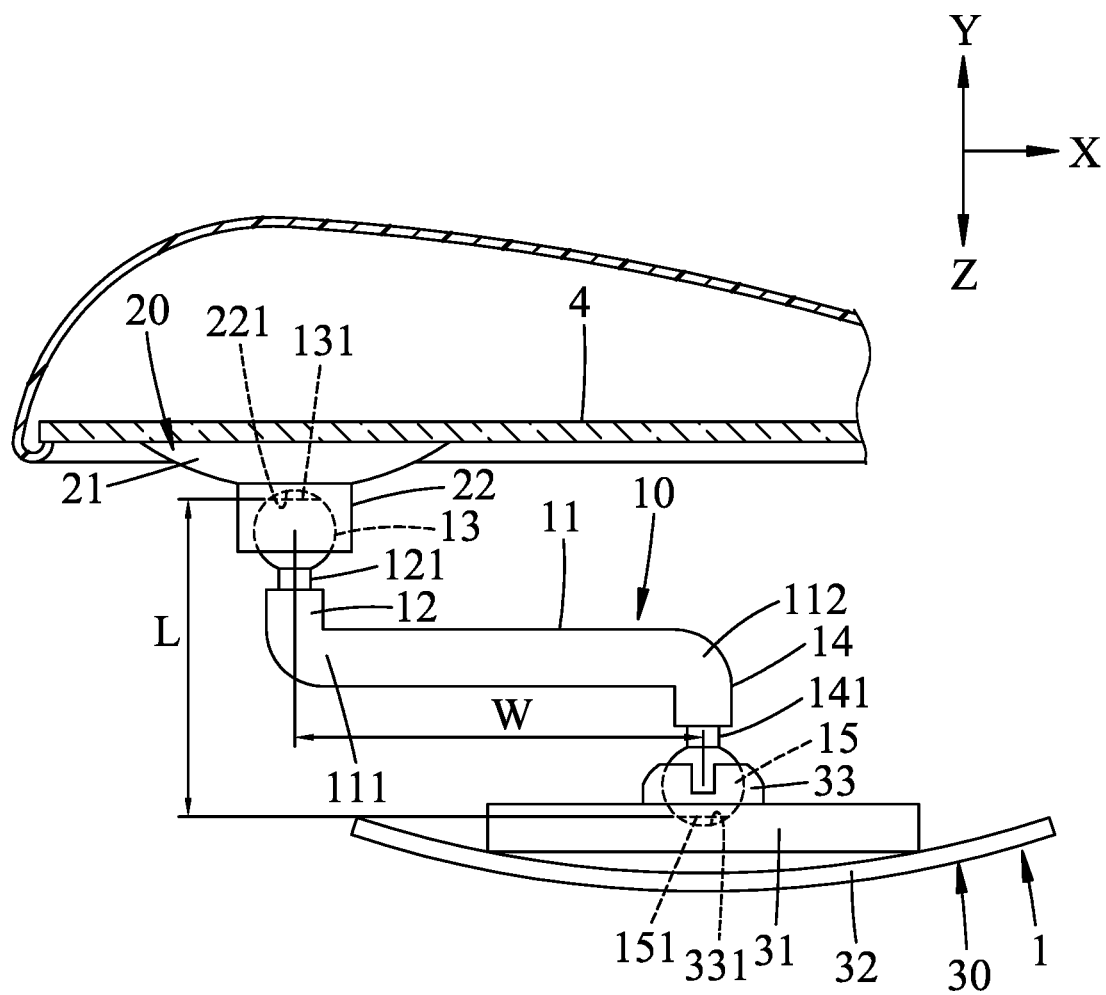
FIG. 3 is a top view illustrating the embodiment mounted to a rear-view mirror.

Referring to FIGS. 1 to 3, an embodiment of an auxiliary vehicle mirror device 1 of the present disclosure is adapted to be mounted to a vehicle accessory, such as a rear-view mirror 4 of a vehicle (shown in FIG. 3), and includes a main rod unit 10, a securing unit 20, and an auxiliary mirror unit 30. It is worth mentioning that the auxiliary vehicle mirror device 1 of the present disclosure is not limited to being mounted to the rearview mirror 4, and may be mounted as an in-vehicle accessory or on the vehicle's exterior body surface.

The main rod unit 10 includes a connecting rod 11, a first fixture rod 12, a first ball fixture 13, a second fixture rod 14, and a second ball fixture 15. The connecting rod 11 extends in a first direction (X), and has a first end 111 and a second end 112 opposite to each other in the first direction (X). The first fixture rod 12 is straight, and extends from the first end 111 of the connecting rod 11 in a second direction (Y) which is perpendicular to the first direction (X). The first ball fixture 13 is disposed on a distal end of the first fixture rod 12. The second fixture rod 14 is straight, and extends from the second end 112 of the connecting rod 11 in a third direction (Z) which is perpendicular to the first direction (X) and opposite to the second direction (Y). The second ball fixture 15 is disposed on a distal end of the second fixture rod 14.

The first fixture rod 12 has a first attenuated rod section 121 connected to the first ball fixture 13, and the second fixture rod 14 has a second attenuated rod section 141 connected to the second ball fixture 15.

The first ball fixture 13 has a first flat facing 131 that is opposite to the first attenuated rod section 121 of the first fixture rod 12 in the second direction (Y), and the second ball fixture 15 has a second flat facing 151 that is opposite to the second attenuated rod section 141 of the second fixture rod 14 in the third direction (Z).

As shown in FIG. 2, a distance (L) represents the sum of a distance between the first flat facing 131 of the first ball fixture 13 and the first end 111 of the connecting rod 11 in the second direction (Y) and a distance between the second flat facing 151 of the second ball fixture 15 and the second end 112 of the connecting rod 11 in the third direction (Z). In addition, a turning radius (W) represents a distance between the first and second ends 111, 112 of the connecting rod 11 in the first direction (X).

The securing unit 20 includes an attachment seat 21 that is adapted to be mounted to the vehicle accessory, and a first socket seat 22 that is disposed on the attachment seat 21, and that has a first socket space 221 engaged with the first ball fixture 13. The first ball fixture 13 is freely rotatable relative to the first socket seat 22, is held stationary by the first socket seat 22 when not rotating, and is inseparable from the first socket space 221.

The first ball fixture 13 is tightly fitted in the first socket space 221, so that the first socket seat 22 can hold the first ball fixture 13 stationary.

The attachment seat 21 is a suction cup in this embodiment, and in other embodiments the attachment seat 21 may be mounted to the vehicle accessory with double-sided adhesive tape.

The auxiliary mirror unit 30 includes a connection seat 31 that has a first surface 311 and a second surface 312 opposite to the first surface, a mirror 32 that is fixed to the first surface 311 of the connection seat 31, and a second socket seat 33 that is disposed on the second surface 312 of the connection seat 31.

The mirror 32 is a convex mirror in this embodiment, which can increase the field of vision of a driver of the vehicle, but in other embodiments, the mirror 32 may be a plane mirror. When the mirror 32 is a convex mirror, the first surface 311 of the connection seat 31 may be fittingly formed into a corresponding convex surface for stable contact with the mirror 32.

The second socket seat 33 has a second socket space 331 engaged with the second ball fixture 15. The second socket seat 33 is freely rotatable relative to the second ball fixture 15, is held stationary by the second ball fixture 15 when not rotating, and is inseparable from the second ball fixture 15. The second ball fixture 15 is tightly fitted in the second socket space 331, so that the second socket seat 33 can hold the second ball fixture 15 stationary.

The configuration that the first ball fixture 13 has the first flat facing 131 reduces friction and avoids impediment when the first ball fixture 13 rotates relative to the first socket seat 22. In addition, when the second ball fixture 15 is rotated, less friction is generated and impediment is avoided due to having the second flat facing 151. Hence, the rotations of the first ball fixture 13 and the second ball fixture 15 can be quite smooth.

By the first fixture rod 12 having the first attenuated rod section 121 connected to the first ball fixture 13, the range of motion of the first ball fixture 13 is increased. If the first fixture rod 12 did not have the attenuated rod section 121, the first fixture rod 12 will interfere with the rotation of the first ball fixture 13 and restrict the range of motion of the first ball fixture 13. Likewise, by the second fixture rod 14 having the second attenuated rod section 141 connected to the second ball fixture 15, the range of motion of the second ball fixture 15 is increased. If the second fixture rod 14 did not have the second attenuated rod section 141, the second fixture rod 14 will interfere with the rotation of the second ball fixture 15.

In use, it is only necessary to mount the attachment seat 21 to the rear-view mirror 4 of the vehicle. The driver may rotate the first ball fixture 13 and the second ball fixture 15 relative to the respective first socket seat 22 and second socket seat 33. In turn, the mirror 32 can be adjusted to a position for rear viewing, or for monitoring the blind spots of the vehicle.

Figure 4:
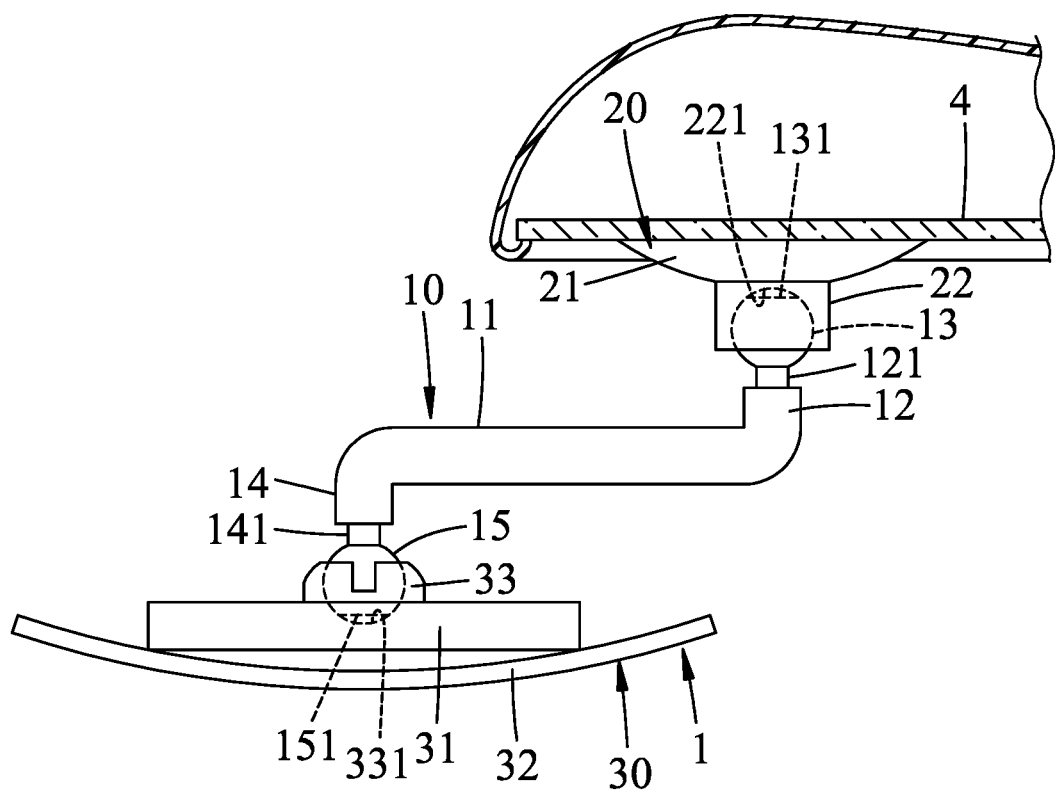
FIG. 4 is a view similar to FIG. 3, but illustrating a main rod unit of the embodiment being rotated 180 degrees from that of FIG. 3.

Referring to FIGS. 3 and 4, which show the attachment seat 21 mounted to the rear-view mirror 4. When the first fixture rod 12 is used as a fixed axis, the first ball fixture 13 may make a full rotation of 360 degrees. Accordingly, the preferred installation position of the attachment seat 21 is on the edge of the rear-view mirror 4. When the attachment seat 21 has been installed on the edge of the rear-view mirror 4, the first ball fixture 13 is able to be rotated above the rear-view mirror 4 to reduce obstruction of the rear-view mirror 4 and provide additional field of vision. Similarly, when installed at the left side, right side, or bottom side of the rear-view mirror 4, the ability of the first ball fixture 13 to make a full rotation of 360 degrees can prevent obstruction of the rear-view mirror 4 and provide increased field of vision.

Figure 5:
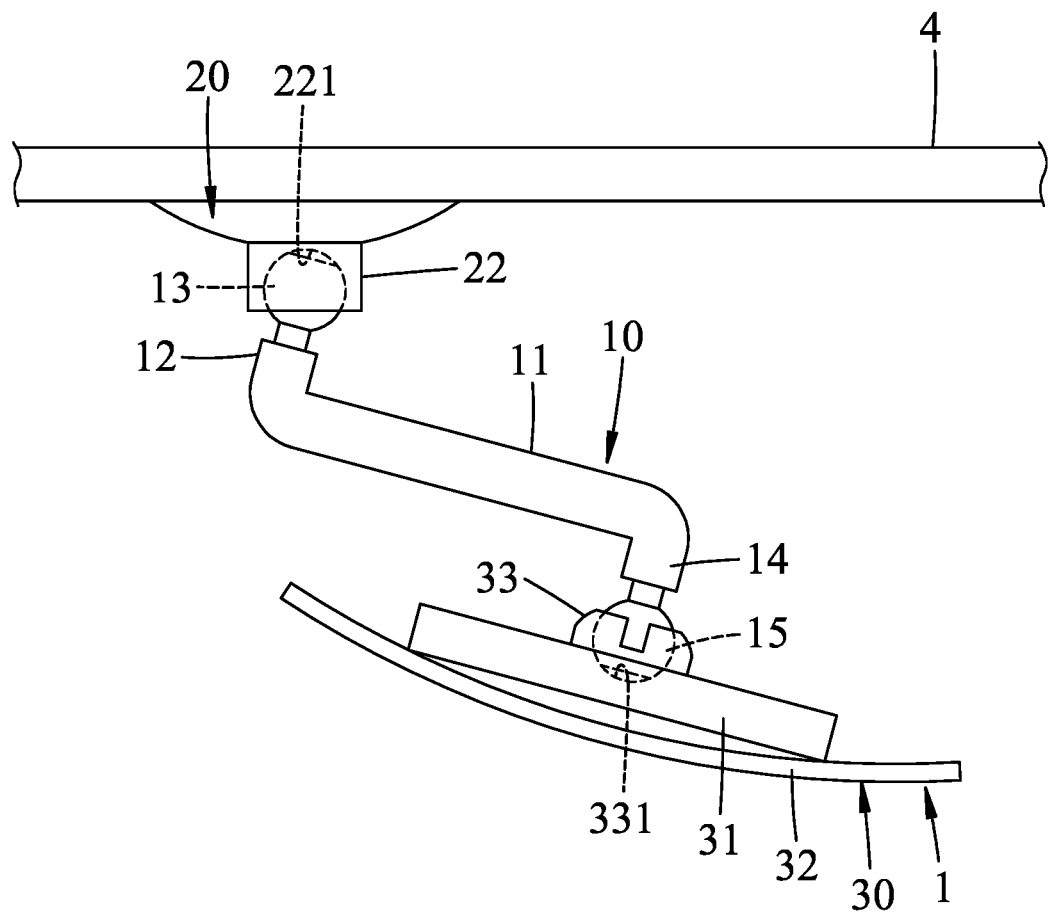
FIG. 5 is a view similar to FIG. 3 but illustrating the embodiment casually adjusted.
Figure 6:
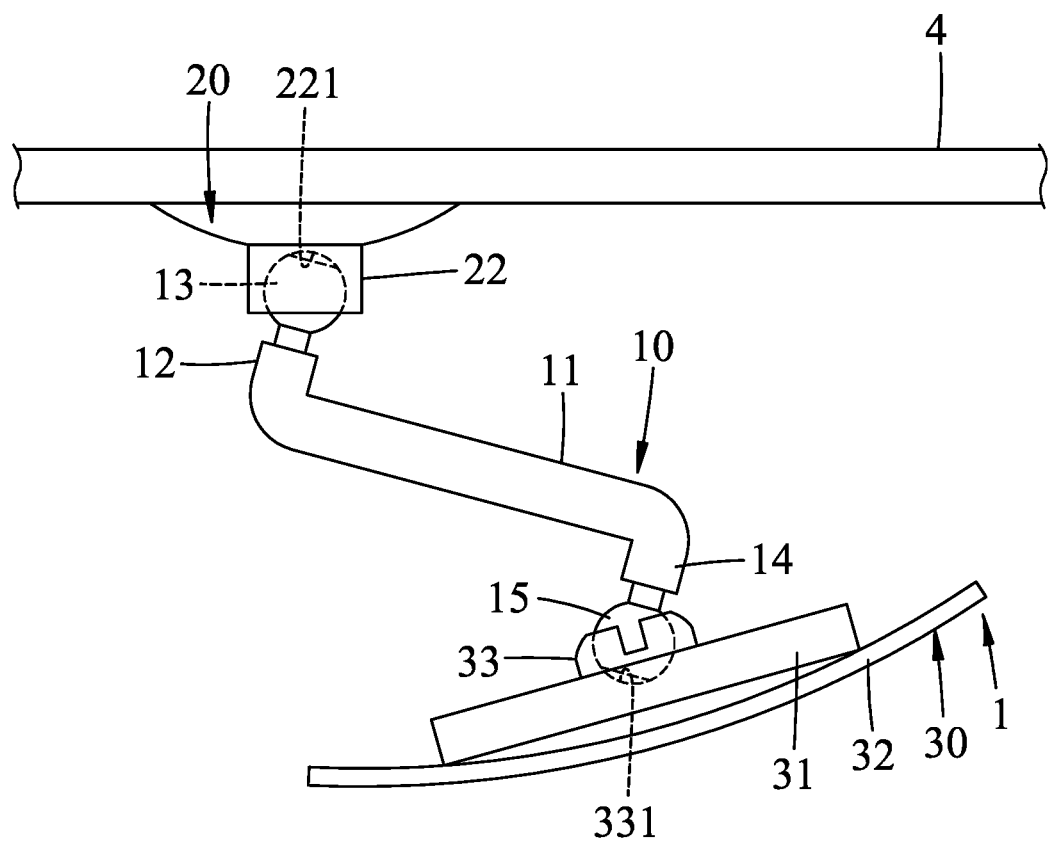
FIG. 6 is a view similar to FIG. 5, illustrating fine tuning of the embodiment.

Referring to FIGS. 5 and 6, the driver may casually adjust or finely tune the viewing angle of the mirror 32 to keep the passengers in the rear seat within the driver's field of vision. When it is desired to casually adjust the angle of the mirror 32, only the connecting rod 11 is manipulated. The position of the connecting rod 11 is adjustable due to the rotatability of the first ball fixture 13. By virtue of the configuration of the main rod unit 10, where the first and second fixture rods 12, 14 are perpendicular to the connecting rod 11, the mirror 32 can make a large angle adjustment, thereby allowing the driver to quickly change his/her field of vision and maintain situational awareness. In contrast to the above, when fine tuning the viewable angle of the mirror 32, only the mirror 32 is pulled. The mirror 32 may rotate relative to the second ball fixture 15 by the rotation of the second ball fixture 15 in the second socket seat 33. In this manner, the mirror 32 can make a small angle adjustment, thereby allowing the driver to achieve precise vision control of the mirror 32.

It is worth mentioning that the auxiliary vehicle mirror device 1 of the present disclosure may also be mounted to a vehicle B-pillar (not shown) for the passengers to monitor traffic behind the vehicle, thereby enhancing safety when opening a vehicle door and exiting the vehicle.

Through the above description, the effects and advantages of the auxiliary vehicle mirror device 1 of the present disclosure can be summarized as follows.

1. The first fixture rod 12 and the second fixture rod 14 extend in opposite directions, and are straight and perpendicular to the connecting rod 11. As such, the first ball fixture 13 may rotate a full rotation of 360 degrees relative to the first socket seat 22. Incidents where the auxiliary vehicle mirror device 1 obstructs the rear-view mirror 4 may be reduced and an auxiliary field of vision may be provided. The viewing angle of the mirror 32 may also be casually adjusted or finely tuned to satisfy the view angle requirements of the driver.

2. The auxiliary vehicle mirror 32 can be adjusted to monitor a blind spot to the rear of the vehicle, the rear seat passengers may first view the auxiliary vehicle mirror device 1 to determine that there is no incoming traffic before opening the vehicle door so that accidents may be prevented.

3. The first ball fixture 13 of the main rod unit 10 has the first flat facing 131, and the second ball fixture 15 has the second flat facing 151. As such, the first ball fixture 13 and the first socket seat 22 may rotate smoothly relative to each other, and the second ball fixture 15 and the second socket seat 33 may rotate smoothly relative to each other. Therefore, smooth adjustment of the auxiliary vehicle mirror device 1 can be achieved.

4. By the first fixture rod 12 having the first attenuated rod section 121, the range of motion of the first ball fixture 13 relative to the first socket seat 22 may be increased. By virtue of the second fixture rod 14 having the second attenuated rod section 141, the range of motion of the second ball fixture 15 relative to the second socket seat 33 may be increased. In this way, the adjustability of the mirror 32 may be increased.

In summary, the auxiliary vehicle mirror device 1 can certainly achieve the object of the disclosure.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An auxiliary vehicle mirror device configured to be mounted to a vehicle accessory, and comprising:
    a main rod unit including
        a connecting rod that extends in a first direction, and that has a first end and a second end opposite to each other in the first direction,
        a first fixture rod that is straight, and that extends from said first end of said connecting rod in a second direction which is perpendicular to the first direction,
        a first ball fixture that is disposed on a distal end of said first fixture rod,
        a second fixture rod that is straight, and that extends from said second end of said connecting rod in a third direction which is perpendicular to the first direction and opposite to the second direction, and
        a second ball fixture that is disposed on a distal end of said second fixture rod;
    a securing unit including
        an attachment seat that is configured to be mounted to the vehicle accessory, and
        a first socket seat that is disposed on said attachment seat, and that has a first socket space engaged with said first ball fixture, said first ball fixture being freely rotatable relative to said first socket seat, being held stationary by said first socket seat when not rotating, and being inseparable from said first socket space; and
    an auxiliary mirror unit including
        a connection seat that has a first surface and a second surface being opposite to said first surface,
        a mirror that is fixed to said first surface of said connection seat, and
        a second socket seat that is disposed on said second surface of said connection seat, and that has a second socket space engaged with said second ball fixture, said second socket seat being freely rotatable relative to said second ball fixture, being held stationary by said second ball fixture when not rotating, and being inseparable from said second ball fixture.

2. The auxiliary vehicle mirror device as claimed in claim 1, wherein:
    said first fixture rod has a first attenuated rod section connected to said first ball fixture; and
    said second fixture rod has a second attenuated rod section connected to said second ball fixture.

3. The auxiliary vehicle mirror device as claimed in claim 1, wherein:
    said first ball fixture has a first flat facing that is opposite to said first fixture rod in the second direction; and
    said second ball fixture has a second flat facing that is opposite to said second fixture rod in the third direction.

4. The auxiliary vehicle mirror device as claimed in claim 2, wherein:
    said first ball fixture has a first flat facing that is opposite to said first attenuated rod section in the second direction; and
    said second ball fixture has a second flat facing that is opposite to said second attenuated rod section in the third direction.

5. The auxiliary vehicle mirror device as claimed in claim 1, wherein:
    said first ball fixture is tightly fitted in said first socket space; and
    said second ball fixture is tightly fitted in said second socket space.

* * * * *